(12) United States Patent
Glick et al.

(10) Patent No.: US 11,266,065 B2
(45) Date of Patent: Mar. 8, 2022

(54) FERTILIZER SPREADER FOR ORCHARDS

(71) Applicant: Pequea Machine, Inc., New Holland, PA (US)

(72) Inventors: Isaac Glick, Quarryville, PA (US); Ethan Hunt, Coatesville, PA (US)

(73) Assignee: Pequea Machine, Inc., New Holland, PA (US)

( * ) Notice: Subject to any disclaimer, the term of this patent is extended or adjusted under 35 U.S.C. 154(b) by 225 days.

(21) Appl. No.: 16/441,492

(22) Filed: Jun. 14, 2019

(65) Prior Publication Data
US 2019/0387667 A1 Dec. 26, 2019

Related U.S. Application Data

(63) Continuation of application No. 62/690,262, filed on Jun. 26, 2018.

(51) Int. Cl.
*A01C 15/12* (2006.01)
(52) U.S. Cl.
CPC .................. *A01C 15/122* (2013.01)
(58) Field of Classification Search
CPC ............................. A01C 15/122; A01C 15/18
USPC ........................................ 239/672, 674, 655
See application file for complete search history.

(56) References Cited

U.S. PATENT DOCUMENTS

| 2,416,898 | A | | 3/1947 | Breeze | |
| 3,780,955 | A | * | 12/1973 | Palmer | A01C 15/00 239/672 |
| 4,121,774 | A | | 10/1978 | van der Lely et al. | |
| 4,478,369 | A | * | 10/1984 | Von Holten | A01C 15/18 239/664 |
| 4,781,513 | A | | 11/1988 | Leif et al. | |

* cited by examiner

*Primary Examiner* — Christopher S Kim
(74) *Attorney, Agent, or Firm* — Miller Law Group, PLLC

(57) ABSTRACT

An orchard fertilizer spreader has rearwardly positioned conveyors that are independently laterally extendable between a minimum width transport position and a maximum width operating position to deliver fertilizer from a supply tank to the orchard trees. The conveyors are mounted in a longitudinally spaced configuration to permit a diverter box to supply fertilizer to either conveyor or to both conveyors simultaneously through manipulation of diverter panels. The conveyors are mounted on a support pan formed with a plurality of rollers to facilitate the lateral extension of the conveyors. The support pan is pivotally mounted on a frame to forma a breakaway that enables the conveyors to rotate in the event of impact between a conveyor and an object. The reset of the conveyors into the laterally extended position is accomplished with a hydraulic cylinder. The conveyors can be laterally extended manually, or via a hydraulic cylinder.

17 Claims, 15 Drawing Sheets

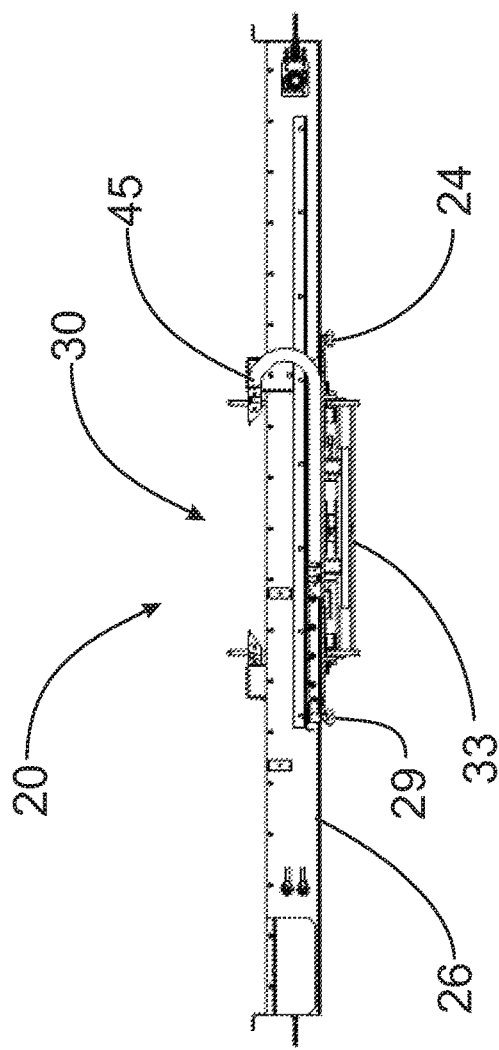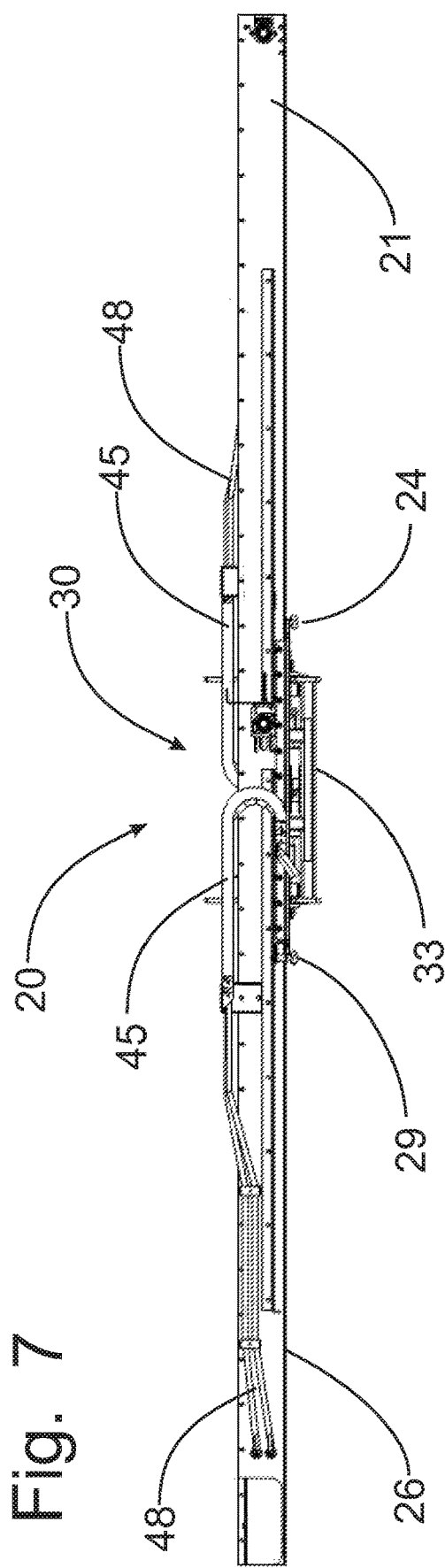

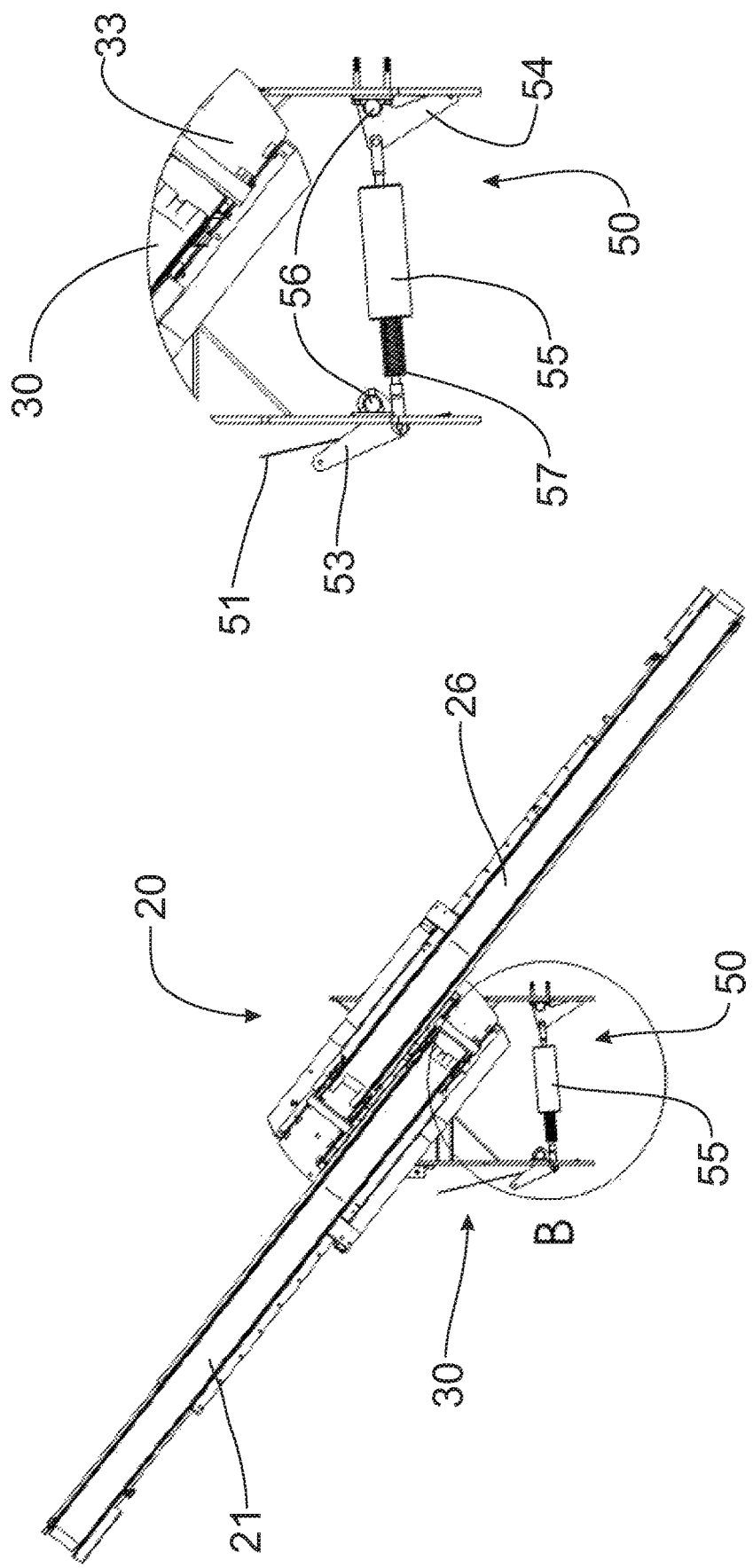

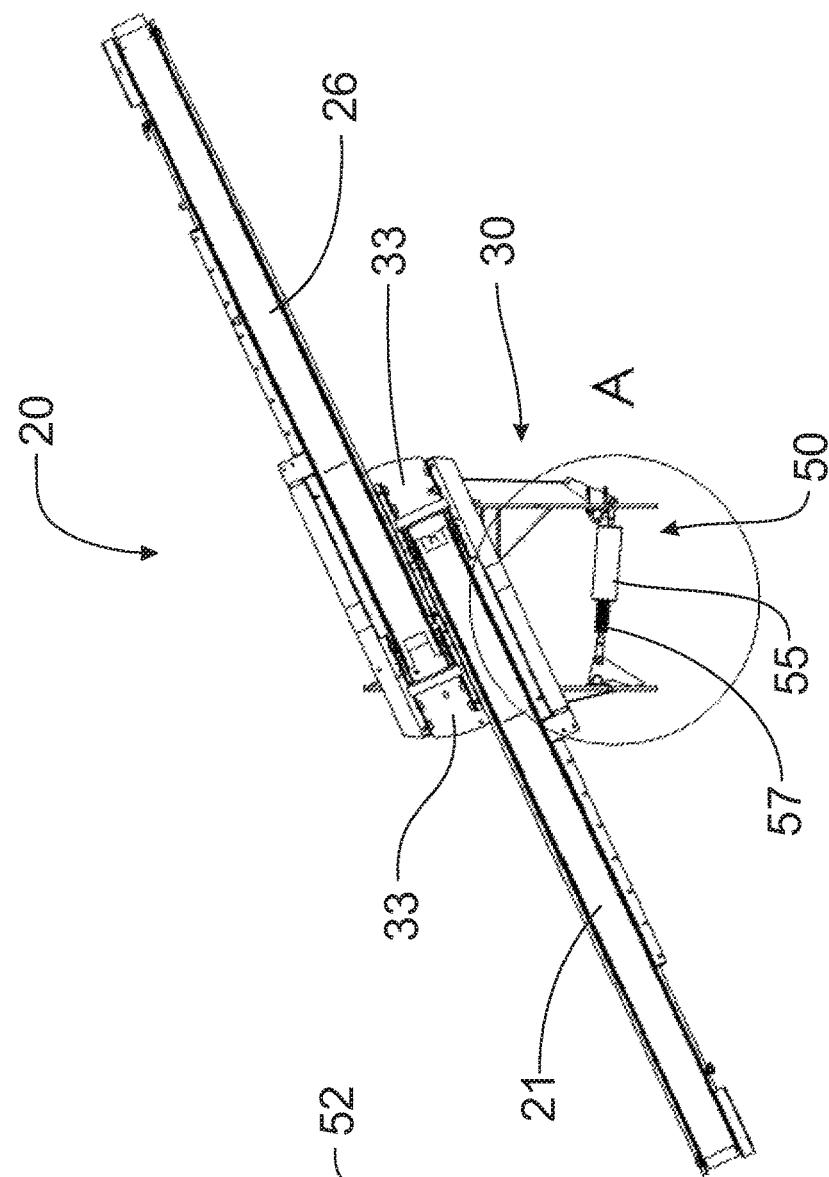
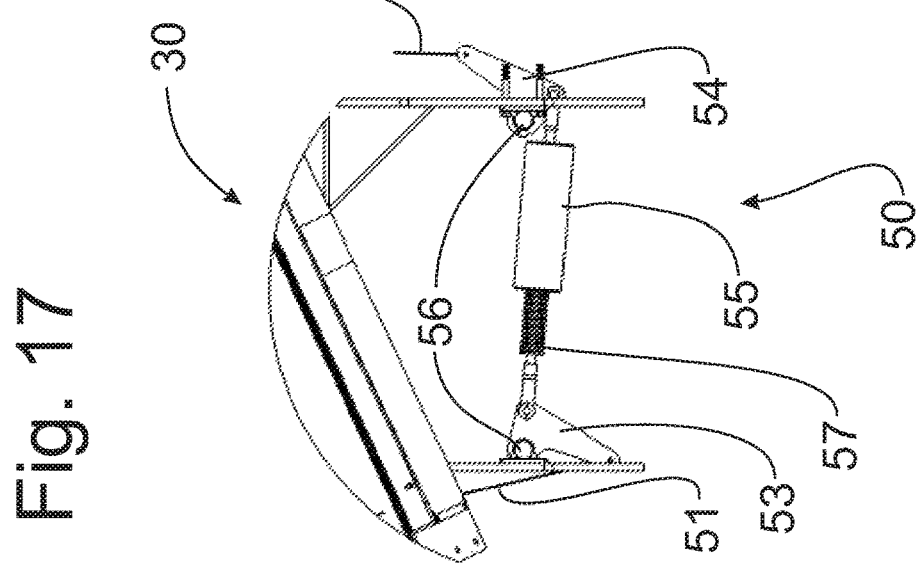

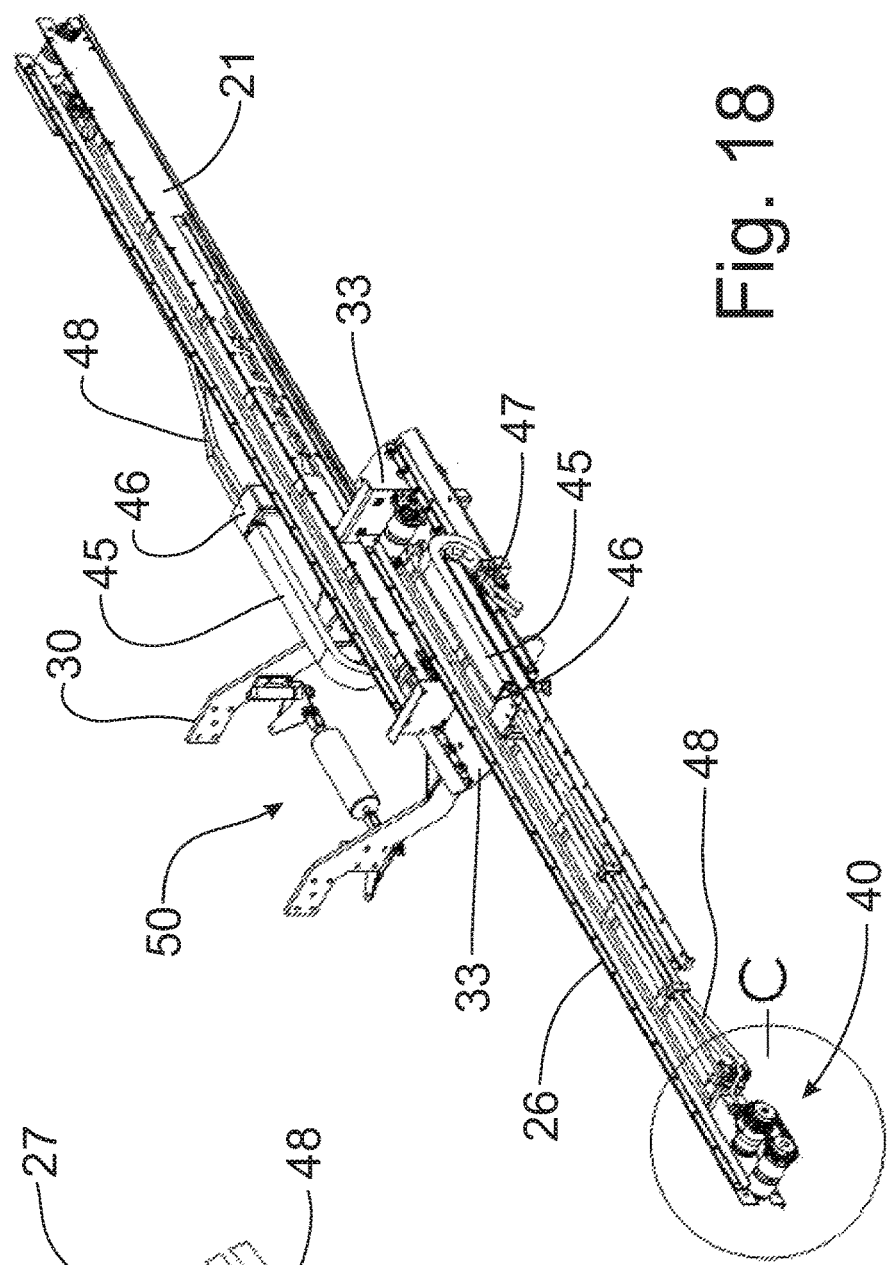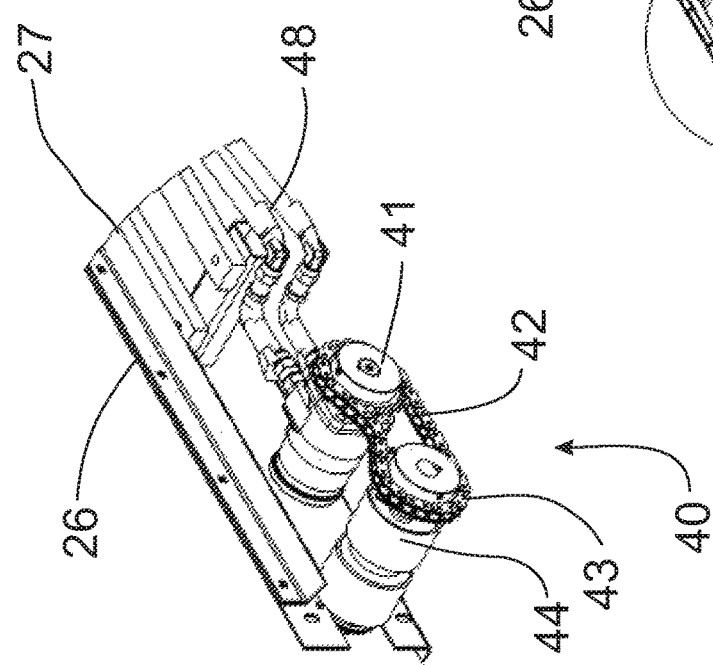

FERTILIZER SPREADER FOR ORCHARDS

CROSS-REFERENCE TO RELATED APPLICATIONS

This application claims domestic priority on U. S. Provisional Patent Application Ser. No. 62/690,262, filed on Jun. 26, 2018, the content of which is incorporated herein by reference.

FIELD OF THE INVENTION

This invention relates generally to fertilizer spreaders and, more particularly, to a fertilizer spreader having spreading devices specifically adapted for use in an orchard to place fertilizer along adjacent rows of trees.

BACKGROUND OF THE INVENTION

Generally, fertilizer spreaders are manufactured with a tank providing a capacity to carry a substantial quantity of fertilizer for distribution to crop or to ground onto which crop is to be planted. Typically, the fertilizer spreader has a distribution mechanism that receives fertilizer from the tank and spreads the fertilizer onto the ground in an effective distribution. However, fertilizer spreaders for orchards, in which trees are planted in rows spread apart a significant distance, the fertilizer needs to be delivered outboard of the spreader to the trees rather than to the ground between the respective rows of trees.

For a fertilizer spreader that incorporates a distribution mechanism that extends in a lateral, outboard direction to distribute fertilizer along a location that is spaced laterally from the fertilizer spreader, the impact of a distal end of that laterally extended distribution device will cause a substantial amount of torque to the distribution mechanism due to the extended moment arm between a central support for the laterally extended distribution device and the point of impact. In such situations, it would be desirable to provide a breakaway mechanism that would minimize damage to the distribution mechanism by allowing movement in the laterally extended distribution device without causing significant damage to the structure of the distribution mechanism.

A conveyor for discharging bulk material, such as asphalt, from a tank at a distal end of the conveyor remote from the tank carrying a supply of the bulk material is taught in U.S. Pat. No. 4,781,513, granted on Nov. 1, 1988, to Leif Ajogren, et al, in which a first spiral auger conveyor receives material from the tank and discharges the material into a second spiral auger conveyor that discharges the material from the remote end. The first conveyor is pivotally connected to the tank so that the discharge of material can be at a selected point along an arc of at least 180 degrees, while the second auger conveyor is pivotally connected to the first conveyor to provide an increased range of delivery of the bulk material along the delivery arc.

In U.S. Pat. No. 4,121,774, granted on Oct. 24, 1978, to Ary van der Lely, et al, a spreading implement including a pair of opposing conveyors extending laterally from side by side funnel shaped infeed devices for delivering material to the conveyors. The conveyors are supported on foldable boom members that are operable to fold the conveyors somewhat in a lateral direction. However, the range of movement of each of these conveyors is dependent on the foldable booms as the conveyors are fixed at the center of the tank containing a supply of the material to be spread laterally. Furthermore, the mobility of the conveyors attached to the tank structure is significantly limited.

U.S. Pat. No. 2,416,898, granted on Mar. 4, 1947, to Charles A. Breeze, discloses a fertilizer distributor mounted to the rear of a tank carrying a supply of the fertilizer for distribution thereby. The mechanism includes a pair of opposing conveyors extending laterally from a central hopper delivering fertilizer to both conveyors simultaneously. The conveyors are relatively short and are intended to distribute fertilizer along the transverse length thereof as scrapers or other ejecting devices are provided to remove the fertilizer from the surface of the conveyor belts. Accordingly, this Breeze apparatus provides a mechanism for distributing fertilizer along the transverse width of the respective conveyors, rather than delivery to a remote discharge end of the conveyors.

It would be desirable to provide an improved fertilizer spreader that is adapted for use in an orchard that permits an adjustable width of operation in the delivery of fertilizer to the rows of trees and that incorporates a breakaway mechanism that minimizes damage to the distribution mechanism if the end of the distribution mechanism impacts a tree.

SUMMARY OF THE INVENTION

It is an object of this invention to overcome the disadvantages of the prior art by providing a fertilizer spreader that is particularly adapted and configured for operation in an orchard.

It is another object of this invention that the fertilizer spreader is formed with opposing conveying structures that deliver fertilizer from a supply tank to a remote point outboard in opposing directions from the supply tank.

It is a feature of this invention that the conveyor structures can be extended laterally at selectively varying positions to select the discharge point for the fertilizer.

It is an advantage of this invention that the conveyor structures can be positioned to locate the discharge point of the conveyors at the desired position for distribution of the fertilizer to the trees irrespective of the row spacing of the orchard trees.

It is another feature of this invention that the conveyor structures can be retracted to a minimum width position behind the supply tank.

It is still another feature of this invention that each conveyor structure is independently extendable laterally.

It is another advantage of this invention that fertilizer can be delivered to one row of orchard trees located laterally to one side of the supply tank.

It is still another object of this invention to provide a breakaway mechanism that permits the conveyor structures to be pivoted relative to the supply tank in the event the outboard end of one of the conveyor structures impacts an object.

It is yet another feature of this invention that the conveyor structures are mounted on a support pan that can pivot relative to the frame of the supply tank to enable the distal end of one conveyor to trail rearwardly of the distal end of the opposing conveyor.

It is still another feature of this invention that the breakaway mechanism can be reset into a laterally extending operative position by activating a hydraulic cylinder.

It is yet another advantage of this invention that the breakaway feature can minimize damage to the conveyor structures when an object, such as an orchard tree, is impacted.

It is still another advantage of this invention that the fertilizer spreader is operable to place the fertilizer along the line of trees in the orchard instead of on the ground between the rows of trees.

It is a further feature of this invention that the two opposing conveyor structures are mounted on the support pan in a longitudinally spaced orientation with one conveyor being located forwardly of the other opposing conveyor.

It is still a further feature of this invention that the supply tank incorporates a diverter box for directing fertilizer onto the respective conveyors.

It is a further advantage of this invention that the diverter box can be configured with diverter panels to deliver fertilizer to a selected one of the conveyors or to both of the conveyors simultaneously.

It is still a further feature of this invention that the lateral extension of the respective conveyors structures can be accomplished manually or with the use of hydraulic cylinders.

It is still a further advantage of this invention that the selected laterally extended position of the respective conveyor structures can be locked into the selected position by the insertion of a locking pin.

It is another feature of this invention that the support pan is configured with a plurality of rollers to facilitate the lateral movement of the conveyor structures.

It is yet another feature of this invention that the conveyor structures can be extended laterally in opposing directions between a minimum width transport position and a maximum width operating position and any intermediate position therebetween.

It is still another advantage of this invention that the fertilizer spreader is operable to distribute fertilizer off of the distal discharge ends of the respective conveyors irrespective of the lateral extension of the conveyors.

It is still another object of this invention to provide a fertilizer spreader for use in an orchard having laterally positionable conveyors delivering fertilizer from a supply tank to the discharge end of the respective conveyors that is durable in construction, inexpensive of manufacture, carefree of maintenance, easy to assemble, and simple and effective in use.

These and other objects, features and advantages are accomplished according to the instant invention by providing an orchard fertilizer spreader having rearwardly positioned conveyors that are independently laterally extendable between a minimum width transport position and a maximum width operating position to deliver fertilizer from a supply tank to the orchard trees. The conveyors are mounted in a longitudinally spaced configuration to permit a diverter box to supply fertilizer to either conveyor or to both conveyors simultaneously through manipulation of diverter panels. The conveyors are mounted on a support pan formed with a plurality of rollers to facilitate the lateral extension of the conveyors. The support pan is pivotally mounted on a frame to form a breakaway that enables the conveyors to rotate in the event of impact between a conveyor and an object. The reset of the conveyors into the laterally extended position is accomplished with a hydraulic cylinder. The conveyors can be laterally extended manually, or via a hydraulic cylinder.

BRIEF DESCRIPTION OF THE DRAWINGS

The advantages of this invention will become apparent upon consideration of the following detailed disclosure of the invention, especially when taken in conjunction with the accompanying drawings wherein:

FIG. 6 is a rear elevational view of the distribution mechanism removed from the spreader frame with the distribution mechanism being depicted in the transport orientation;

FIG. 7 is a rear elevational view of the distribution mechanism removed from the spreader frame with the distribution mechanism being depicted in the maximum spread width orientation;

FIG. 14 is a schematic top plan view of the distribution mechanism showing the breakaway apparatus corresponding to an impact by the right end of the distribution mechanism;

FIG. 15 is an enlarged top plan view of the breakaway apparatus corresponding to circle B in FIG. 14;

FIG. 16 is a schematic top plan view of the distribution mechanism showing the breakaway apparatus corresponding to an impact by the left end of the distribution mechanism;

FIG. 17 is an enlarged top plan view of the breakaway apparatus corresponding to circle A in FIG. 16;

FIG. 18 is a left rear perspective view of the distribution mechanism depicted in the maximum spread width configuration;

FIG. 19 is an enlarged perspective view of the drive mechanism powering the operation of one of the conveyors of the distribution mechanism.

DETAILED DESCRIPTION OF THE PREFERRED EMBODIMENTS

Figure 1:
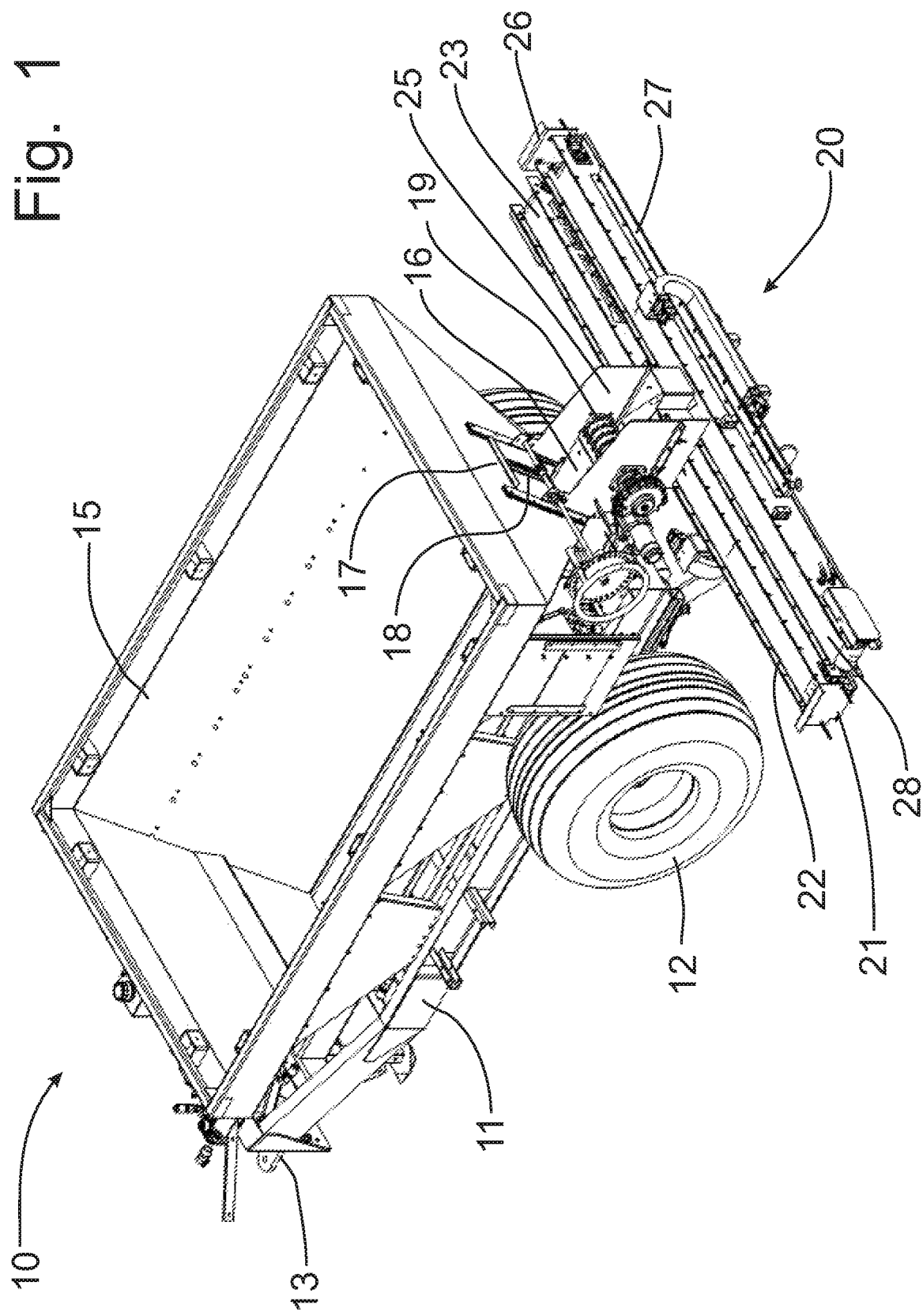
FIG. 1 is a left rear perspective view of a fertilizer spreader incorporating the principles of the instant invention, the fertilizer spreader being depicted in a transport configuration.

Referring now to FIGS. 1-5, a fertilizer spreader specifically adapted to deliver fertilizer to rows of trees in an orchard can best be seen. The fertilizer spreader 10 includes a frame 11 provided with wheels 12 that mobilely support a tank 15 having sloped sides that deliver fertilizer onto a central conveyor 16 at the bottom apex of the tank 15 for movement across the surface of the ground. Preferably, the frame 11 terminates at the forward end thereof in a hitch device 13 that enables the fertilizer spreader 10 to be couple to a prime mover (not shown), such as a tractor, to provide power for the movement of the fertilizer spreader 10 over the ground. Also preferably, the forward end of the frame 11 is provided with connection ports 14 that can be coupled to the hydraulic system of the prime mover to provide operative power for the operative components of the fertilizer spreader 10, as are explained in greater detail below.

The rearward end of the frame 11 supports the distribution mechanism 20 for distributing the fertilizer to the rows of trees in the orchard to either side of the fertilizer spreader 10. The distribution mechanism 20 generally includes a diverter box 25 that receives fertilizer conveyed rearwardly by the central conveyor 16 and distributes the fertilizer to one or both of the right and left conveyors 22, 26, as will be described in greater detail below. The rearward end of the tank 15 includes a gate 17 positionally controlled by a rack and pinion actuation device 18 that serves to meter the fertilizer being discharged from the tank via the conveyor 16. The higher the gate 17 is raised, the greater the flow rate of fertilizer carried rearwardly out of the tank 15 by the conveyor 16. Preferably, the conveyor 16 discharges the fertilizer onto a rotating feed member 19 that serves to break up clumps of dry fertilizer discharged off the conveyor 16. The rotary feed member 19 can be driven, along with the central conveyor 16, by a hydraulic motor 19a coupled to a gear reducing gear box that is keyed to a shaft that drives the rear sprocket.

The fertilizer falls into a diverter box 25 that distributes the discharged fertilizer in a selected manner onto one or both of the right and left conveyors 21, 26. Each conveyor 21, 26 includes a frame 22, 27 that supports a hydraulically powered conveyor belt 23, 28 driven to deliver fertilizer from the diverter box 25 to the selected discharge point laterally of the tank 15. Each conveyor 21, 26 is laterally movable to position the remote end of the conveyor belt 23, 28 adjacent the row of trees to be fertilized. Each conveyor 21, 26 is supported on a carrier member 30, best seen in FIGS. 10-12, which connects to the rearward end of the frame 11 of the fertilizer spreader 10 so that the central conveyor 16 and the rotating feed member 19 discharge fertilizer into the diverter box 25.

Figure 10:
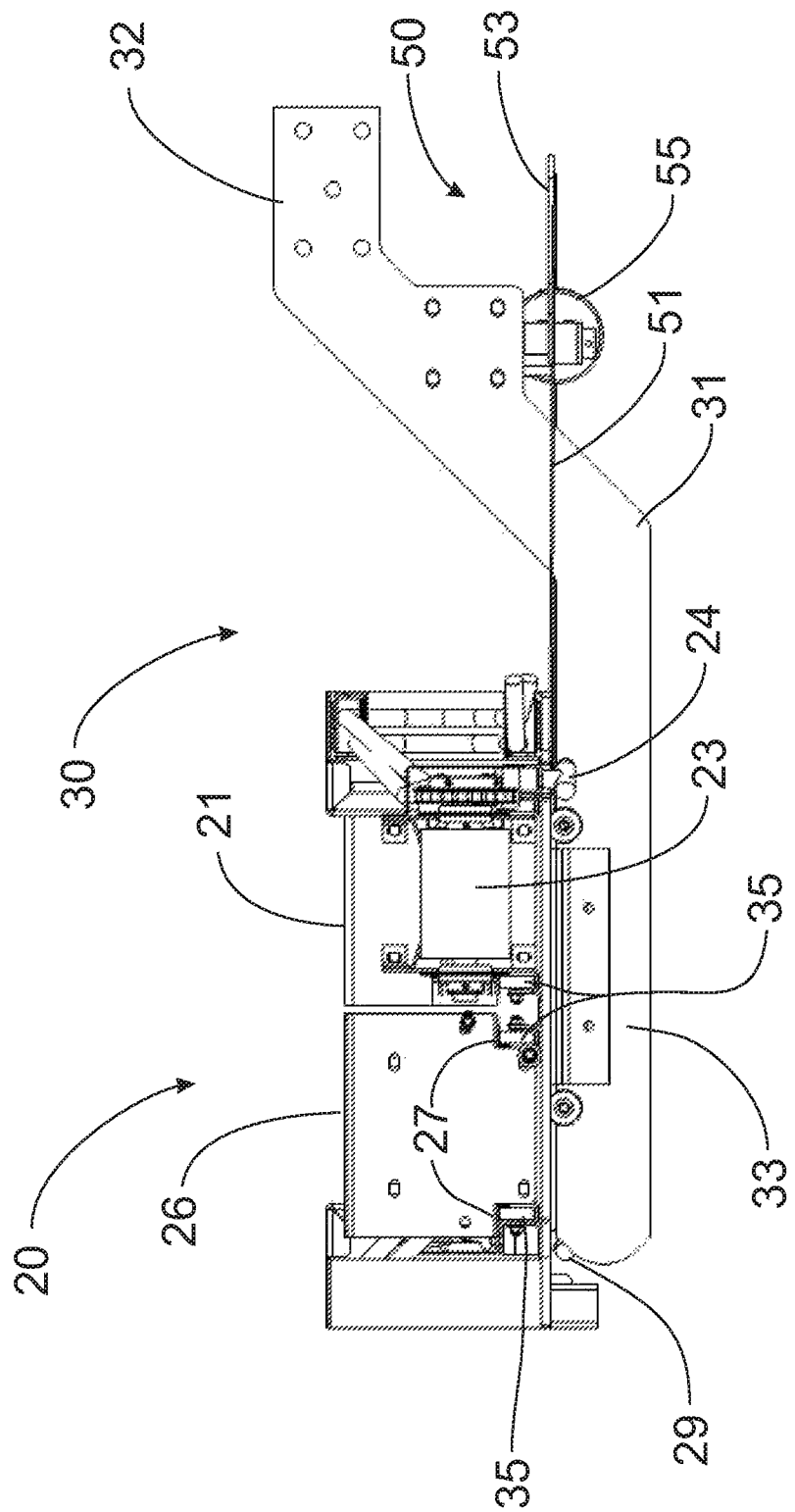
FIG. 10 is a right side elevational view of the carrier frame having the distribution mechanism mounted thereon.
Figure 11:
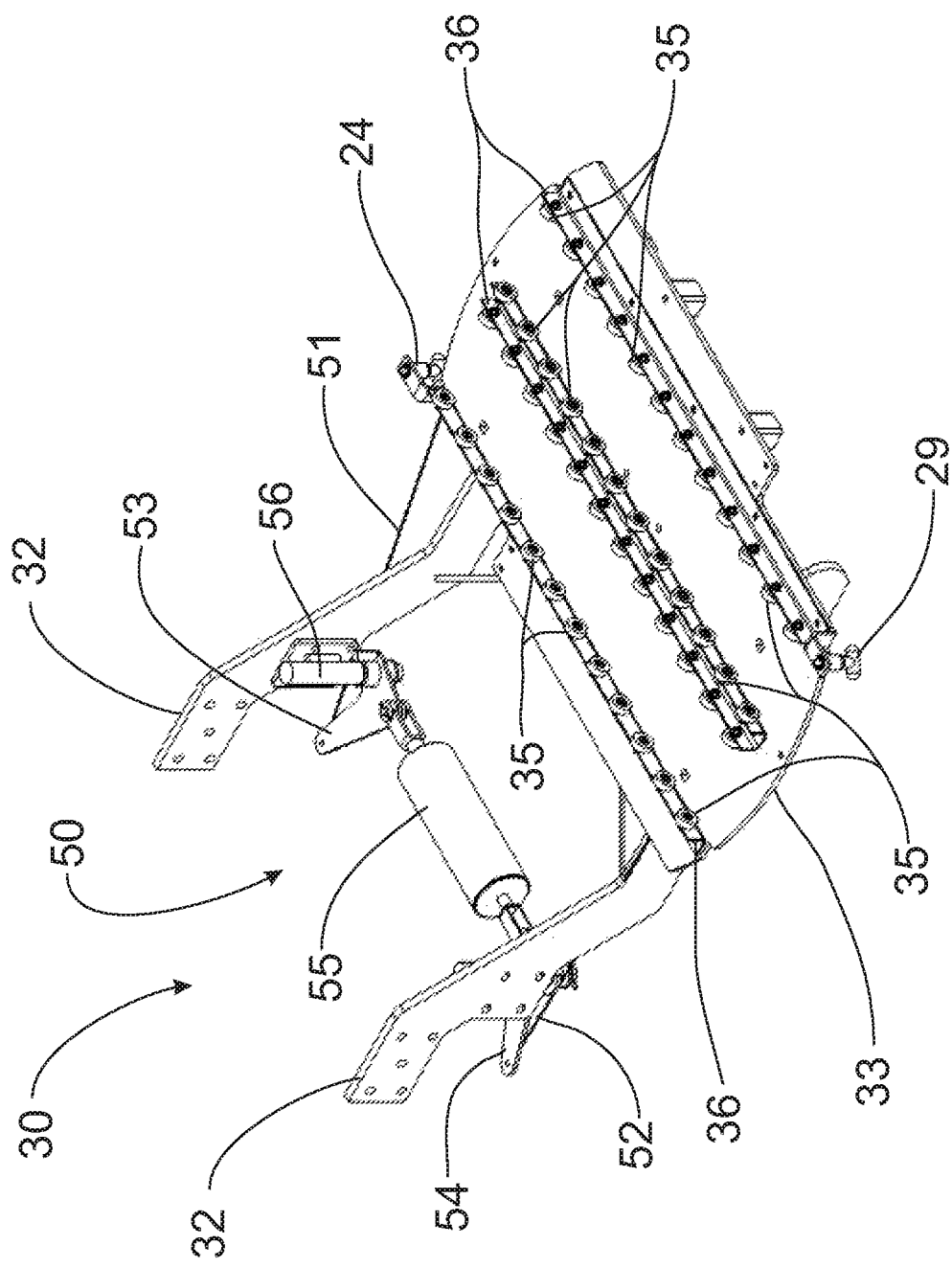
FIG. 11 is a left rear perspective view of the carrier frame for the distribution mechanism with the distribution removed for purposes of clarity to view the support rollers mounted in the carrier frame for movement of the distribution mechanism.
Figure 12:
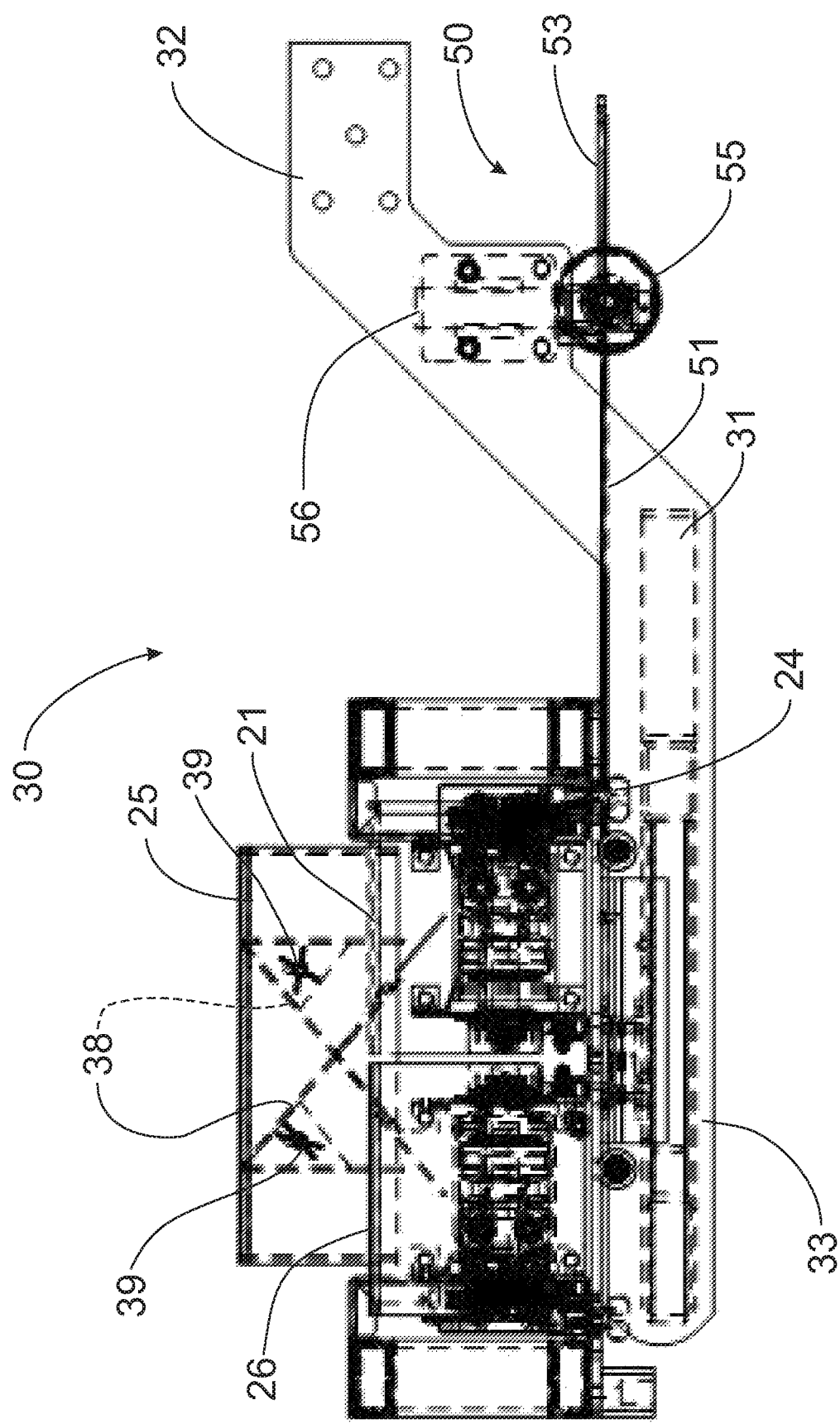
FIG. 12 is an enlarged side elevational view of the distribution mechanism, the diverter box depicting alternative positioning of a diverter plate that enables the selective delivery of fertilizer to either one of the conveyors or both simultaneously.
Figure 13:
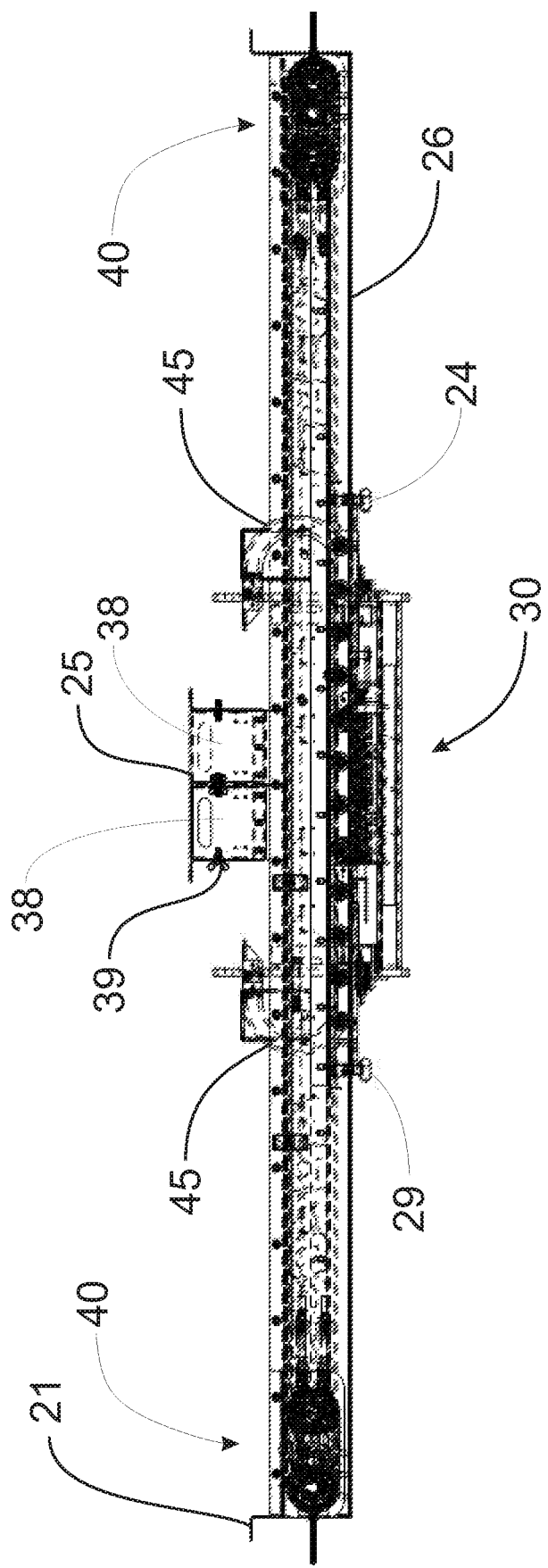
FIG. 13 is a front elevational view of the distribution mechanism, including the diverter box, with the distribution mechanism being oriented in the minimal width transport configuration.
Figure 20:
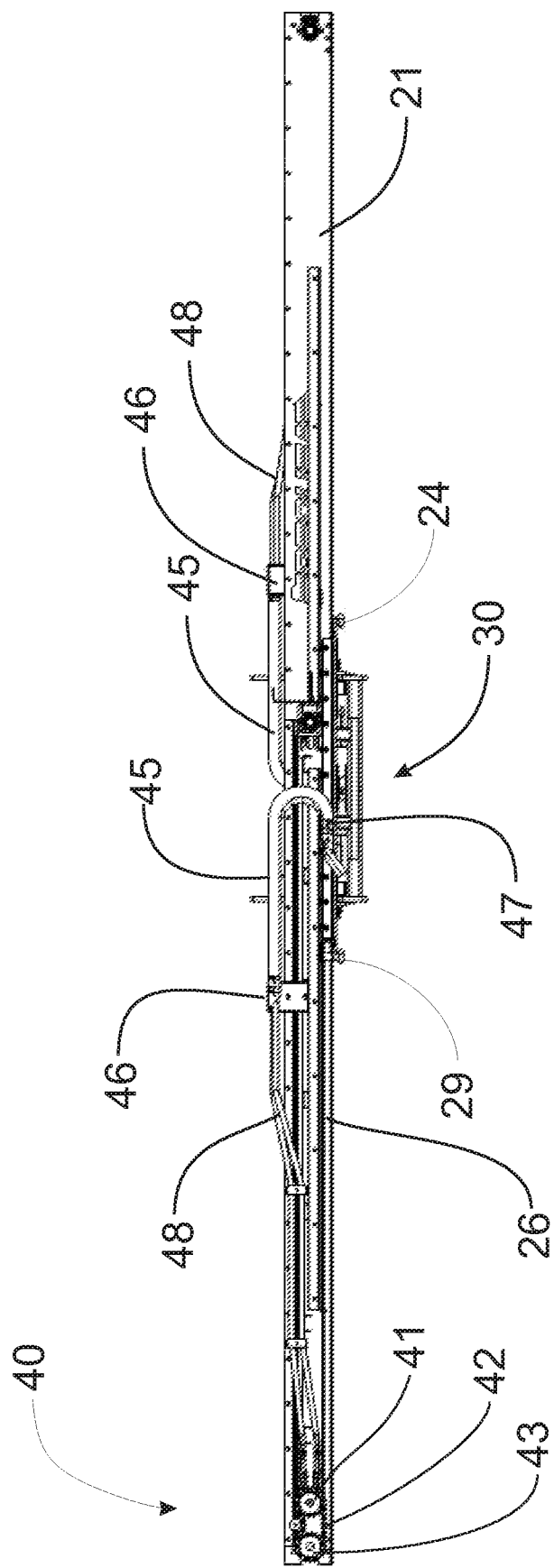
FIG. 20 is a rear elevational view of the distribution mechanism with shielding removed at the left end of the left conveyor for purposes of clarity to show the drive mechanism for the left conveyor.

Referring now to FIGS. 10-12, the details of the carrier frame 30 can best be seen. The carrier member 30 includes an elongated frame 31 having a specific shape that enables the forward connection members 32 to be connected by fasteners or by welding to the underside of the frame 11 of the fertilizer spreader 10 and the rearward support pan 33 to locate the conveyors 21, 26 below the diverter box 25 to receive fertilizer therefrom. The carrier member 30 has a plurality of rollers 35 mounted in transverse brackets 36 to form four lines of rollers extending transversely across the rearward support pan 33. The rollers 35 enable the right and left conveyors 21, 26 to shift laterally for proper positioning for the delivery of the fertilizer to a laterally spaced position for application to the rows of trees in the orchard.

Referring now specifically to FIGS. 1-3, 6-10, 12, 13 and 18, one skilled in the art will recognize that the frames 22, 27 of the right and left conveyors 21, 26 are formed on opposing sides thereof to receive the respective lines of rollers 35 therein. Lateral movement of the conveyors 21, 26 can simply be achieved by manually pulling on the conveyor frames 22, 27 and shifting the frames 22, 27 to the desired position relative to the carrier member 30. A locking pin 24, 29 mounted on the opposing sides of the support pan 33 can be manipulated to engage a hole in the conveyor frames 22, 27 and lock the conveyors 21, 26 into the desired position. One skilled in the art will recognize that the lateral positioning of the respective conveyors 21, 26 could be powered, such as through the use of a hydraulic cylinder or a rack and pinion, or a chain coupled to a hydraulic or electric motor.

Referring now to FIGS. 1-3, 6-9, 13 and 18-20, the details of the conveyors 21, 26 with respect to powering the operation thereof can best be seen. The driving of the right conveyor 21 is essentially the mirror image of the powering of the left conveyor 26, which is best shown in the drawings. The conveyor belt 28 is driven by a hydraulic motor 40 mounted near the distal end of the conveyor frame 27 that is coupled by a chain 41 to a sprocket 42 affixed to the drive roller 43 at the end of the conveyor belt 28. Hydraulic fluid under pressure is delivered through the hydraulic plumbing (not shown) from the prime mover to flexible hydraulic tubing 45 that will permit the lateral movement of the respective conveyors 21, 26 between the transport position shown in FIG. 1 to the maximum spread width position shown in FIG. 2. The flexible hydraulic tubing 45 is connected to fixed hydraulic tubing 48 that is mounted to the frame 27 of the conveyor which is in turn connected to the hydraulic motor 41. Since the distance from the movable end 46 of the flexible tubing 45 to the hydraulic motor 41 is a fixed length irrespective of the position of the conveyor 26, fixed tubing 48 can be utilized. The fixed end 47 of the flexible tubing is mounted to the carrier member 30 and does not move with the lateral movement of the conveyor 26.

Referring now to FIGS. 1-3 and 12, the diverter box 25 is provided with a pair of selectively positionable diverter panels 38 that can be positioned within the diverter box 25 to direct fertilizer to a selected one of the conveyors 21, 26, or opposingly mounted to allow the flow of fertilizer to both conveyors 21, 26 simultaneously. As best seen in FIG. 12, the diverter panel 38 can be secured to the diverter box by a fastener 39 in a position that fertilizer flows directly from the rotary feed member 19 across the diverter panel 38 onto the left conveyor 26. Conversely, the diverter panel 38 can be alternatively secured to the diverter box 25 by the fastener 39 to allow the fertilizer discharged rearwardly by the rotary feed member 19 to flow forwardly and land on the right conveyor 21. Removing the diverter panel 38 allows the rotary feed member 19 to deliver fertilizer to both the conveyors 21, 26.

Preferably, the fertilizer spreader 10 is provided with a breakaway mechanism 50 that will allow the distribution mechanism 20 to rotate when a distal end of one of the conveyors 21, 26 is impacts a solid object, like a tree, to prevent or at least minimize damage to the distribution mechanism 20. The breakaway mechanism 50 is best seen in FIGS. 4, 5, 8, 9, 11, 12 and 14-17 and includes a spring containment member 55 for resetting the distribution mechanism 20 when the breakaway mechanism 50 is actuated. As best seen in FIG. 11, the support pan 33 is coupled to the breakaway mechanism 50 by a pair of laterally spaced links 51, 52 that stabilize the position of the support pan 33 in a central position so that the conveyors 21, 26 extend laterally in a direction perpendicular to the normal direction of travel of the fertilizer distributor 10 coupled to a prime mover (not shown).

The breakaway mechanism 50 further includes a pair of laterally spaced bell cranks 53, 54 that are connected to the respective links 51, 52 and to the opposite ends of the spring containment member 55. Each of the bell cranks 53, 54 have an L-shaped configuration defining three corners. At a first corner, each of the bell cranks is connected to a vertical pivot 56 that allows the respective bell cranks to pivot about the axis defined by the vertical pivot 56. At the second corner a short distance away from the first corner, the bell cranks 53, 54 are connected to the spring containment member 55. One of the bell cranks 54 connects to the base of the spring containment member 55, while the other bell crank 53 connects to the distal end of the extendable rod 57. The third corner of each of the bell cranks 53, 54 is respectively connected to the links 51, 52.

When the support pan 33 is rotated as a result of an impact to a distal end of one of the conveyors 21, 26, the impacted end of that conveyor 21, 26 moves rearwardly causing the corresponding link 51, 52 to pull rearwardly with the connection thereof to the support pan 33. As seen in FIGS. 14 and 15, the forward moving of the link 51 corresponding to the rearward movement of the left conveyor 21 pulls the third corner of the bell crank 53 about the pivot 56 and, as a result, pulls the second corner of the bell crank 53 laterally outwardly from the spring containment member 55. The end result is that to accommodate the movement of the bell crank 53, the extendable rod 57 pulls out of the spring containment member 55 to compress the spring therein. Once the impacted object is cleared, the compressed spring within the spring containment member will pull the bell crank 53 back into the original operating position, which in turn re-positions the support pan 33 to the normal transverse operating position and the fertilizer spreader 10 can continue to operate.

As can be seen in FIGS. 16 and 17, a similar action occurs with the left bell crank 54 when the left conveyor 26 impacts an object, except the left bell crank 54 pulls the base end of the spring containment member 55 laterally outwardly to the left which, because the right bell crank 53 stays in position, causes the extendable rod 57 to pull out of the spring containment member 55. As described above, once the impacted object is cleared, the compressed spring within the spring containment member 55 pulls the support pan 33 and the conveyors 21, 26 back to the transverse operating position. One skilled in the art will recognize that the left and right bell cranks 53, 54 can also be fitted with a set bolts (not shown) that engage the frame member supporting the pivots 56 when the conveyors are in a normal transverse operating position. When the above-described breakaway mechanism 50 operates to pivot one of the bell cranks 53, 54, the corresponding set bolt pulls away from the frame member and when the breakaway mechanism 50 is returned to the neutral position corresponding to the transverse operating configuration of the conveyors 21, 26, the set bolts stop the movement of the conveyors 21, 26 by engaging the frame member, thus stopping any oscillation of the conveyors 21, 26. Furthermore, one skilled in the art will recognize that the spring mechanism 55, 57 can be as shown in the drawings, or a cylinder or a bare extension spring.

Figure 2:
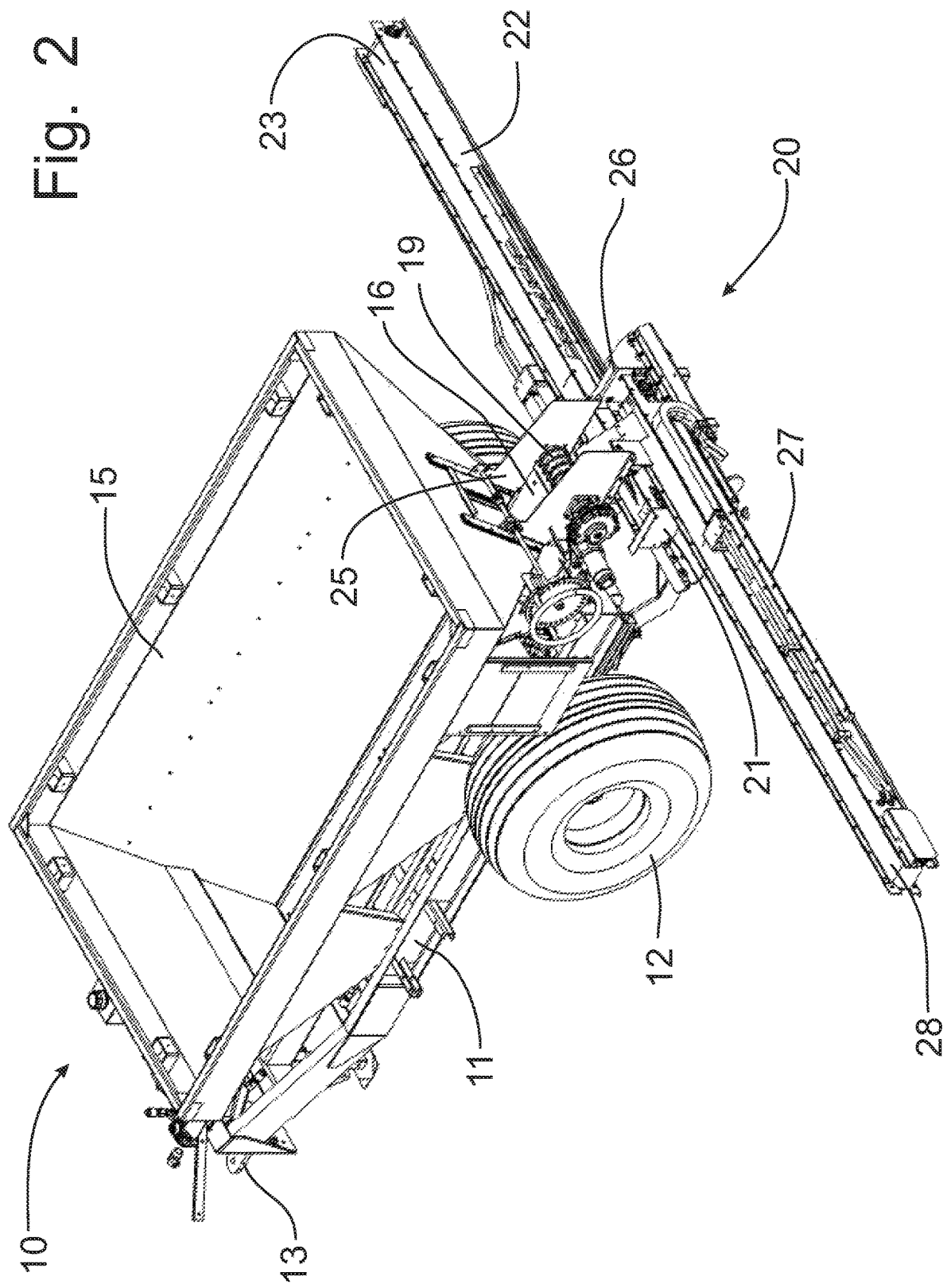
FIG. 2 is a left rear perspective view of the fertilizer spreader shown in FIG. 1, but depicted in a maximum spread width operating configuration.
Figure 3:
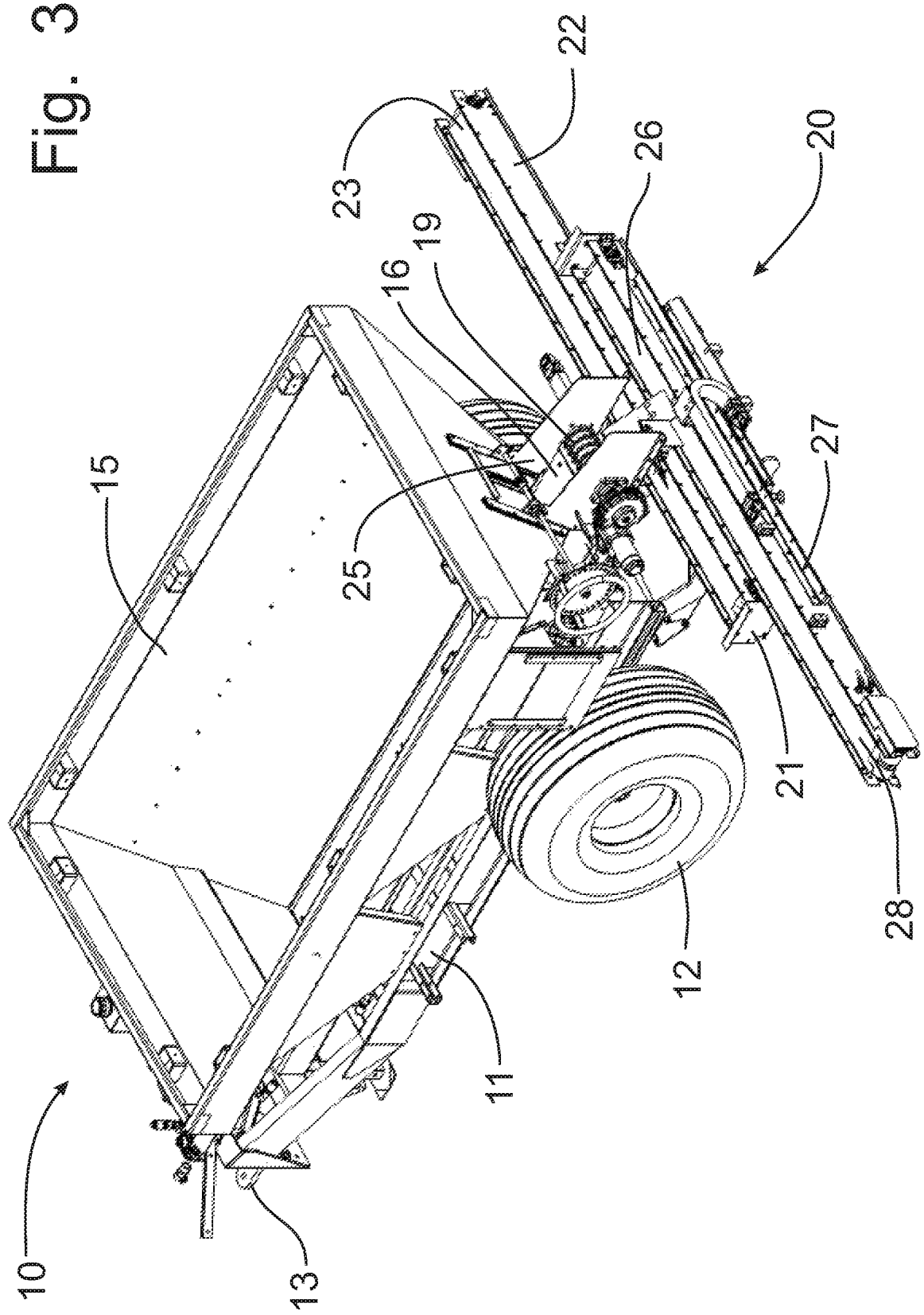
FIG. 3 is a left rear perspective view of the fertilizer spreader shown in FIG. 1, but depicted in an intermediate spread width operating configuration.
Figure 4:
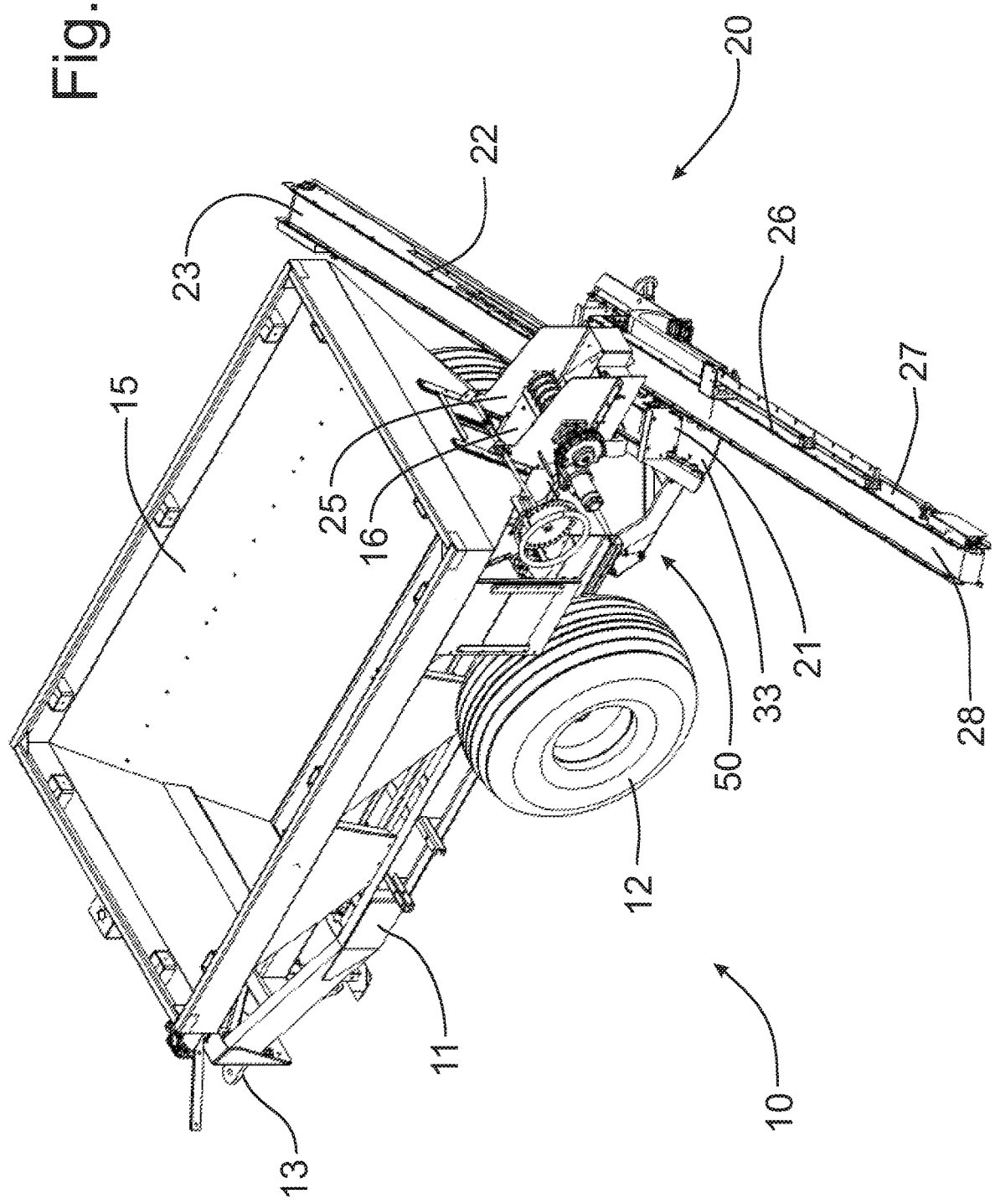
FIG. 4 is a left rear perspective view of the fertilizer spreader in maximum spread width configuration as shown in FIG. 2, but depicted in a breakaway orientation corresponding to the left end of the distribution mechanism impacting a solid object.
Figure 5:
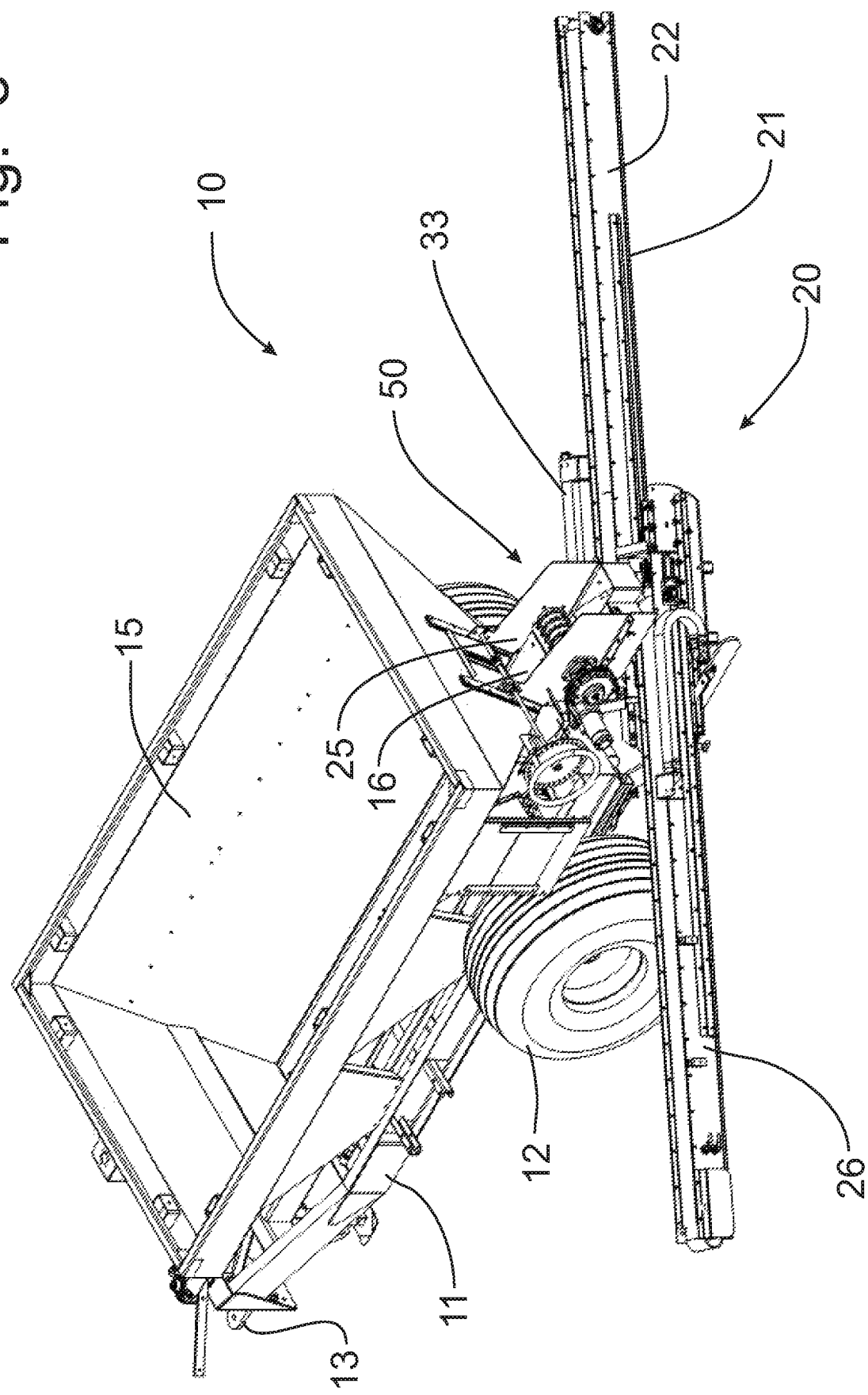
FIG. 5 is a left rear perspective view of the fertilizer spreader in maximum spread width configuration as shown in FIG. 2, but depicted in a breakaway orientation corresponding to the right end of the distribution mechanism impacting a solid object.
Figure 8:
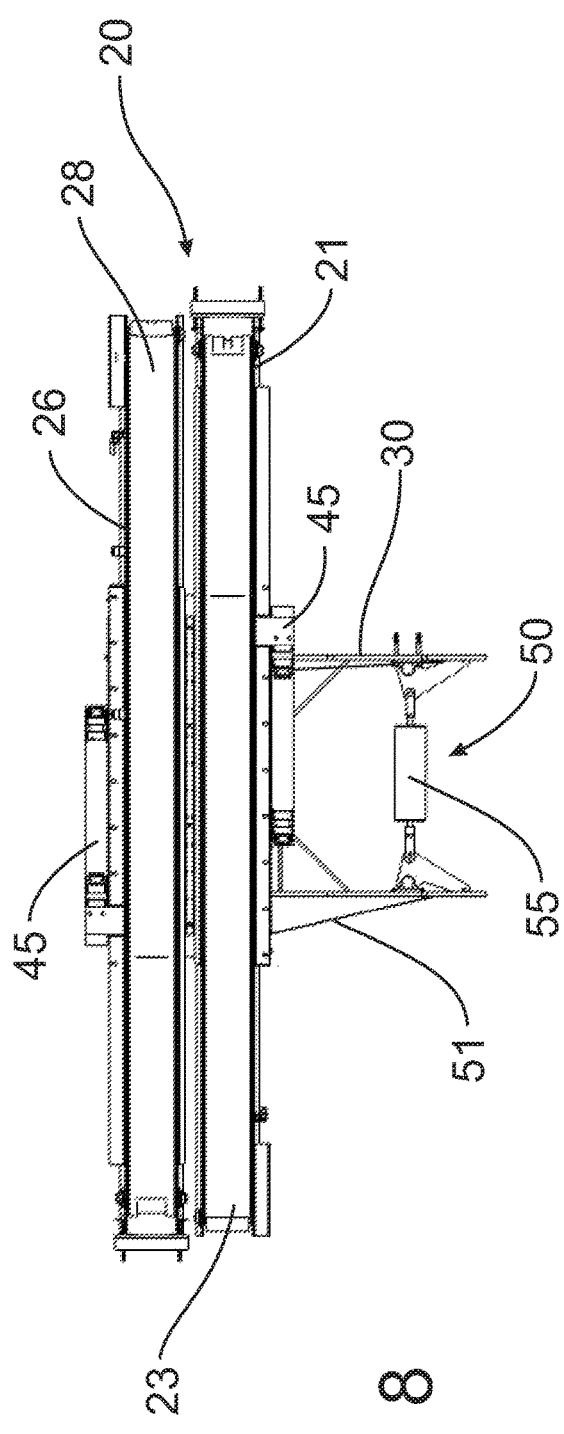
FIG. 8 is a top plan view of the distribution mechanism removed from the spreader frame and being oriented in the transport configuration.
Figure 9:
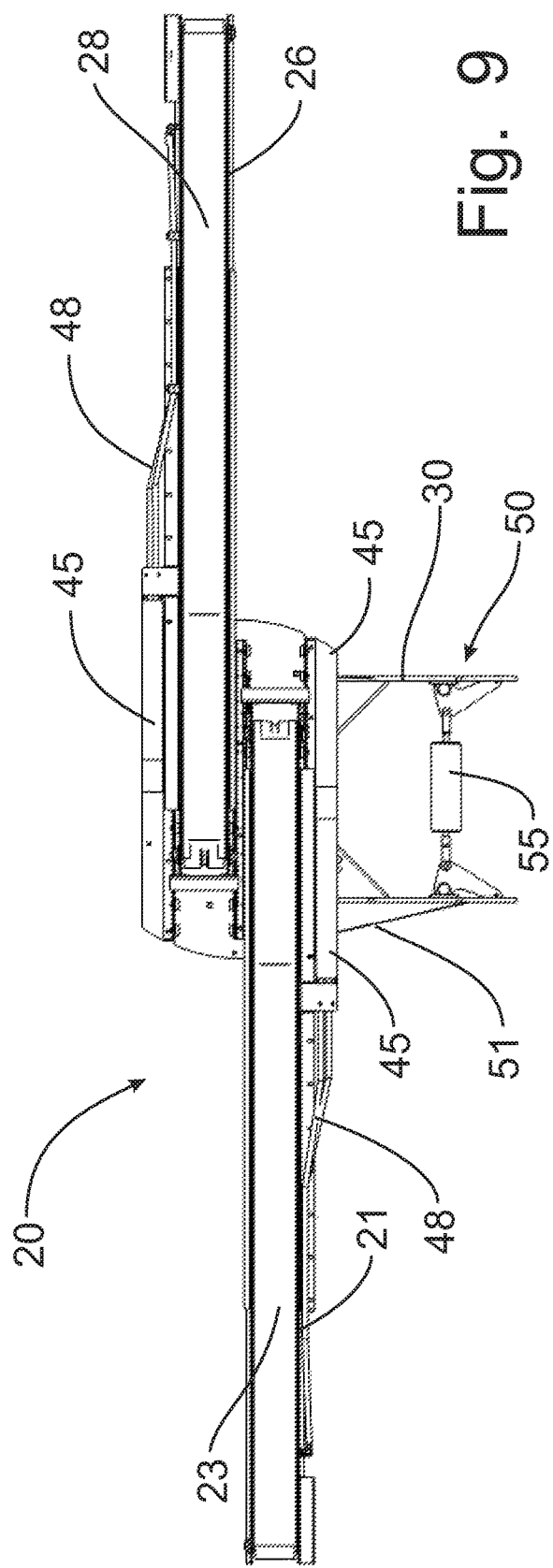
FIG. 9 is a top plan view of the distribution mechanism removed from the spreader frame and being oriented in the maximum spread width configuration.

In operation, the fertilizer spreader 10 receives a supply of fertilizer in the tank 15 and transports the fertilizer to the orchard to be distributed. Once the fertilizer spreader 10 is positioned proximate the center of the ground between two adjacent rows of trees (not shown), the operator unlatches the conveyors 21, 26 and pulls them laterally outwardly to the position desired to enable fertilizer to be deposited along the respective rows of trees. One skilled in the art will recognize that the conveyors 21, 26 have a maximum width position, which is depicted in FIG. 2, in which the conveyor frames 22, 27 capturing the rollers 35 will support the cantilevered orientation of the respective conveyor 21, 26. However, the conveyors 21, 26 are equally operable at an intermediate position, such as is depicted in FIG. 3, which is less than maximum spread width. One skilled in the art will also recognize that a powered option (not shown) could be utilized to laterally position the conveyors 21, 26.

The operator will position the gate 17 to set the preferred flow rate of fertilizer into the diverter box 25, and then activate the hydraulic motor 19a to drive the central conveyor 16 and the rotary feed member 19 and start the flow of fertilizer out of the tank 15 and into the diverter box 25. Assuming that both opposing rows of trees are to have fertilizer distributed to them, the diverter box 25 is arranged with the diverter panel 38 allowing delivery of fertilizer on the top of both conveyor belts 23, 28. The activation of the hydraulic motors 41 results in rotation of the conveyor belts 23, 28 to move the deposited fertilizer laterally outwardly toward the respective opposing rows of trees. Once the fertilizer is properly positioned and the fertilizer is proximate the ends of the respective conveyors 21, 26, the prime mover can be driven to pull the pull-type fertilizer spreader 10 along the rows of trees, whereupon fertilizer is deposited from the respective ends of the conveyor belts 23, 28.

In this manner, the fertilizer is delivered to the trees in the opposing rows, and not onto the ground between the respective rows of trees. In the event only one row of trees is present for the distribution of fertilizer, the appropriate conveyor 21, 26 can be positioned without moving the other conveyor 21, 26. However, one skilled in the art will recognize that the support pan 33 will operate best if balanced by the similar positioning of both conveyors 21, 26. In the event the outboard end of one of the conveyors 21, 26 impacts a tree or other immovable object, the breakaway mechanism 50 will operate as described above to pivot the distribution mechanism 20 on the support pan 33, which automatically reset through operation of the spring containment member 55.

Since the distribution mechanism 20 is mounted to the rear of the fertilizer spreader 10, the impact of a distal end of one of the conveyors 21, 26 will cause a rotational torque to be applied to the support pan 33 with the impacting end of the conveyor 21, 26 trailing rearwardly and the opposite conveyor 21, 26 to move forwardly, as is depicted in FIGS. 4, 5, 14 and 16. This applied torque causes the support pan to rotate relative to the frame 31 of the carrier member 30, resulting in a pulling of the link 51, 52 corresponding to the rearwardly moving conveyor 21, 26. The link 51, 52 corresponding to the forwardly moving conveyor simply slides through a lost motion device (not shown) and does not affect the breakaway mechanism 50.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

In the way of an example, the fertilizer spreader 10 described above is a pull-type unit provided with a hitch device 13 at the forward end of the frame 11 of the fertilizer spreader 10. One skilled in the art will recognize that the fertilizer spreader 10 could also be configured as a self-propelled machine on which the frame 11 supports a motor and drive mechanism (not shown) to power the movement of the fertilizer spreader 10 without being connected to a prime mover, and still be within the scope of the invention.

Having thus described the invention, what is claimed is:

1. A fertilizer spreader for distributing fertilizer to one or more rows of trees in an orchard, comprising:
    a frame;
    a tank supported on said frame and having a central conveyor extending longitudinally through said tank to convey fertilizer received in said tank rearward from said tank; and
    a distribution mechanism mounted on a rearward end of said frame to receive fertilizer from said central conveyor, said distribution mechanism including a pair of conveyors which are laterally extendable to locate a remote end on each said conveyor between an innermost position and a transversely spaced outermost position to deliver fertilizer to a row of trees offset from said tank, said distribution mechanism further including a carrier member having a support pan provided with four rows of rollers extending transversely across said support pan, each said conveyor including a conveyor frame that captures a corresponding pair of rows of said rollers to enable lateral extension of each respective conveyor.

2. The fertilizer spreader of claim 1 wherein said support pan is pivotable relative to said tank to allow said conveyors to move away from a transverse operating orientation in response to an outboard end of one of said conveyors impacting an object.

3. The fertilizer spreader of claim 2 wherein said support pan is connected to a breakaway mechanism that allows pivotable movement of said support pan.

4. The fertilizer spreader of claim 3 wherein said breakaway mechanism comprises:
    a pair of laterally spaced bell cranks corresponding to opposing sides of said support pan, each said bell crank being pivotable about a vertical axis;
    a pair of links interconnecting respective bell cranks and a corresponding side of said support pan such that the pivotable movement of said support pan causes one of said links to pull on the corresponding bell crank to pivot the corresponding bell crank about the corresponding vertical pivot axis; and
    a spring containment member interconnecting said bell cranks, said spring containment member including an extendable rod connected to one of said bell cranks and a base connected to the other of said bell cranks so that when one of said bell cranks pivots as a result of the pivotable movement of said support pan, said extendable rod extends from said spring containment member to compress a spring therein.

5. The fertilizer spreader of claim 4 wherein said spring containment member automatically re-positions said bell cranks after said support pan has been pivoted out of a normal transverse operating position and returns said support pan to said normal transverse operating position through said links.

6. The fertilizer spreader of claim 1 wherein said distribution mechanism also includes a diverter box positioned above said conveyors, said diverter box being operable to receive fertilizer from said central conveyor for dispersal to said conveyors, said diverter box including a diverter panel that can be selectively oriented to deliver all of said fertilizer received in said diverter box to one of said conveyors, as well as being selectively oriented to deliver fertilizer to both said conveyors simultaneously.

7. The fertilizer spreader of claim 6 wherein said tank includes a gate selectively positionable to control a flow rate of fertilizer being transported into said diverter box for delivery to one or more of said conveyors.

8. The fertilizer spreader of claim 1 wherein said conveyors are respectively manually movable laterally to desired laterally extended positions, each said conveyor being selectively engagable with a locking pin carried by said support pan to lock the respective conveyors in the desired laterally extended positions.

9. A fertilizer spreader for distributing fertilizer to one or more rows of trees in an orchard, comprising:
    a frame terminating a forward end in a hitch device for connection to a prime mover;
    a tank supported on said frame and having a central conveyor extending longitudinally through said tank to convey fertilizer received in said tank rearward from said tank;
    a carrier member mounted to a rearward end of said frame and including a support pan pivotable relative to said tank;
    a distribution mechanism mounted on said carrier member to receive fertilizer from said central conveyor, said distribution mechanism including a pair of conveyors which are laterally extendable to deliver fertilizer to a row of trees offset from said tank; and
    a breakaway mechanism coupled to said support pan to enable the pivotal movement of said distribution mechanism in the event an outboard end of one of said conveyors impacts an object.

10. The fertilizer spreader of claim 9 wherein said breakaway mechanism comprises:
    a pair of laterally spaced bell cranks corresponding to opposing sides of said support pan, each said bell crank being pivotable about a vertical axis;
    a pair of links interconnecting respective bell cranks and a corresponding side of said support pan such that the pivotable movement of said support pan causes one of said links to pull on the corresponding bell crank to pivot the corresponding bell crank about the corresponding vertical pivot axis; and
    a spring containment member interconnecting said bell cranks, said spring containment member including an extendable rod connected to one of said bell cranks and a base connected to the other of said bell cranks so that when one of said bell cranks pivots as a result of the pivotable movement of said support pan, said extendable rod extends from said spring containment member to compress a spring therein.

11. The fertilizer spreader of claim 10 wherein said spring containment member automatically re-positions said bell cranks after said support pan has been pivoted out of a normal transverse operating position and returns said support pan to said normal transverse operating position through said links.

12. The fertilizer spreader of claim 9 wherein said distribution mechanism also includes a diverter box positioned above said conveyors, said diverter box being operable to receive fertilizer from said central conveyor for dispersal to said conveyors, said diverter box including a diverter panel that can be selectively oriented to deliver all of said fertilizer received in said diverter box to one of said conveyors, as well as being selectively oriented to deliver fertilizer to both said conveyors simultaneously.

13. The fertilizer spreader of claim 12 wherein said tank includes a gate selectively positionable to control a flow rate of fertilizer being transported into said diverter box for delivery to one or more of said conveyors.

14. The fertilizer spreader of claim 9 wherein said conveyors are manually movable laterally, each said conveyor being selectively engagable with a locking pin carried by said support pan to lock the respective conveyors in the desired laterally extended positions.

15. A fertilizer spreader for distributing fertilizer to one or more rows of trees in an orchard, comprising:
   a frame terminating a forward end in a hitch device for connection to a prime mover;
   a tank supported on said frame and operable to deliver a supply of fertilizer rearwardly from said tank;
   a distribution mechanism support from said tank rearwardly of said tank to receive fertilizer from said tank and direct the fertilizer laterally to said one or more rows of trees, said distribution mechanism including a pair of opposing laterally positionable conveyors which are laterally extendable to locate a remote discharge end on each said conveyor between an innermost position and a transversely spaced outermost position so as to be operable to convey fertilizer to each said remote discharge end positioned laterally of the supply tank, said conveyors being mounted in a longitudinally spaced configuration with one conveyor being located forwardly of the other conveyor, said distribution mechanism including a diverter box for distributing fertilizer from said tank onto said conveyors, said diverter box including diverter panels that are positionable to permit distribution to a respective one of said conveyors or to both conveyors simultaneously, said distribution mechanism also including a support pan pivotally mounted on a positionally fixed member connected to said frame, said conveyors being supported on said support pan so as to be extendable independently between a minimal spacing transport position and a maximum spacing operating position, and a breakaway mechanism coupled to said support pan to enable the pivotal movement of said conveyors in the event an outboard end of one of said conveyors is obstructed.

16. The fertilizer spreader of claim 15 wherein said breakaway mechanism comprises:
   a pair of laterally spaced bell cranks corresponding to opposing sides of said support pan, each said bell crank being pivotable about a vertical axis;
   a pair of links interconnecting respective bell cranks and a corresponding side of said support pan such that the pivotable movement of said support pan causes one of said links to pull on the corresponding bell crank to pivot the corresponding bell crank about the corresponding vertical pivot axis; and
   a spring containment member interconnecting said bell cranks, said spring containment member including an extendable rod connected to one of said bell cranks and a base connected to the other of said bell cranks so that when one of said bell cranks pivots as a result of the pivotable movement of said support pan, said extendable rod extends from said spring containment member to compress a spring therein.

17. The fertilizer spreader of claim 16 wherein said spring containment member automatically re-positions said bell cranks after said support pan has been pivoted out of a normal transverse operating position and returns said support pan to said normal transverse operating position through said links.

* * * * *